UNITED STATES PATENT OFFICE.

MARK C. RICH, OF HOT SPRINGS, SOUTH DAKOTA.

MANUFACTURE OF SYRUP.

1,104,135.      Specification of Letters Patent.      Patented July 21, 1914.

No Drawing.      Application filed November 28, 1911. Serial No. 662,918.

*To all whom it may concern:*

Be it known that I, MARK C. RICH, a resident of Hot Springs, in the county of Fall River and State of South Dakota, have invented certain new and useful Improvements in the Manufacture of Syrup, of which the following is a full, clear, and exact description.

The invention relates to the manufacture of food products from alfalfa. This material has long been recognized as a good food for cattle or stock because of its tissue-building properties, but has not been used for human food because it was not palatable as usually treated or prepared for stock or cattle.

In the preparation of alfalfa as a food for cattle or stock, it is usually left to grow until it is, and is cut when, about 30 to 35 days old and is about half in bloom. At this stage of its growth, the alfalfa is about 20 to 24 inches high, and is woody, fibrous, somewhat hard and is of such a character that it has not been considered desirable for human food.

By experiment, it has been discovered that if alfalfa is harvested and treated as hereinafter set forth, it may be utilized in the preparation of foods for human consumption, and may be rendered both palatable and digestible.

According to the present improvement, the alfalfa is cut, when it is from 8 to 12 inches high and approximately 14 days old and before it has become woody, fibrous and hard as compared with its condition when it is about 30 to 35 days old and approximately from 20 to 24 inches high. By cutting the alfalfa at the earlier stage pointed out, the products made therefrom will lack the properties which have made it undesirable for human consumption. The alfalfa is cut about 4 inches above the ground leaving about 4 inches stubble. As it is cut by a mower, it is caught in baskets and deposited in small bunches of about a bushel each, and laid on the stubble where it is permitted to remain for about 24 hours and during that period, the air will circulate through the bunches, and the leaves of the alfalfa will wilt and the stems will be partially dried so that about one half of the inherent moisture in the alfalfa will be removed. This treatment of alfalfa which has been cut at the stage pointed out, sweetens the odor of and partially cures the alfalfa. Next, the alfalfa is gathered and stored very loosely in layers or on racks and subjected to artificial heat of approximately 150 degrees Fahrenheit, from 3 to 7 days. This treatment prevents bleaching and causes the alfalfa to retain its desirable flavor and aroma and remain light green in color. The period in which the alfalfa is subjected to artificial heat is varied according to the amount of moisture in the alfalfa and the weather. The alfalfa, after it has been thus dried, is then ground. This product may then be used in the preparation of different foods or beverages for human consumption. Eight ounces of this ground green alfalfa are then mixed with nine pounds of water and boiled for about three hours. Next, the liquid is strained and mixed with about two and one half pounds of glucose. A pound of granulated sugar or cane syrup is then added and the mixture is boiled together until its weight is reduced to about 8 pounds. The resultant product will be an alfalfa syrup in which its properties are utilized in a syrup for human consumption, and which may be used as a flavoring for food or as an ingredient of a medicine.

The invention is not to be understood as restricted to the precise ingredients and practice set forth, since these may be departed from in the scope of the appended claims, without departing from the scope and spirit of the invention.

Having thus described the invention, what I claim as new and desire to secure by Letters Patent, is:

1. A syrup containing an infusion of alfalfa, glucose and a saccharine syrup.

2. A syrup containing a strained infusion of alfalfa and a saccharine syrup.

3. That improvement which consists in cutting alfalfa before it becomes woody and fibrous, subjecting it to artificial heat and grinding it, boiling it with water and straining the infusion and then boiling said infusion with a saccharine syrup.

4. That improvement which consists in cutting alfalfa before it becomes woody and fibrous, subjecting it to artificial heat and grinding it, boiling it with water, straining the infusion, and then boiling said infusion with glucose and a saccharine syrup.

Signed at Chicago, Illinois, this 28th day of October, A. D. 1911.

MARK C. RICH.

Witnesses:
 FRED GERLACH,
 F. W. BOWER.

---

Copies of this patent may be obtained for five cents each, by addressing the "Commissioner of Patents, Washington, D. C."